(12) United States Patent
Byun

(10) Patent No.: US 12,442,661 B2
(45) Date of Patent: Oct. 14, 2025

(54) SENSING DEVICE

(71) Applicant: LG INNOTEK CO., LTD., Seoul (KR)

(72) Inventor: Sung Wook Byun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 178 days.

(21) Appl. No.: 18/557,489

(22) PCT Filed: Apr. 27, 2022

(86) PCT No.: PCT/KR2022/006021
§ 371 (c)(1),
(2) Date: Oct. 26, 2023

(87) PCT Pub. No.: WO2022/231301
PCT Pub. Date: Nov. 3, 2022

(65) Prior Publication Data
US 2024/0377225 A1    Nov. 14, 2024

(30) Foreign Application Priority Data

Apr. 27, 2021 (KR) .......................... 10-2021-0054388
Aug. 27, 2021 (KR) .......................... 10-2021-0113914

(51) Int. Cl.
*G01D 3/028* (2006.01)
*G01D 5/12* (2006.01)

(52) U.S. Cl.
CPC .............. *G01D 3/028* (2013.01); *G01D 5/12* (2013.01)

(58) Field of Classification Search
CPC .. G01R 33/091; G01R 33/0011; G01R 33/07; G01R 33/06; G01L 5/00; G01L 3/10;
(Continued)

(56) References Cited

U.S. PATENT DOCUMENTS

2014/0139207 A1* 5/2014 Nakamura ............... B62D 6/10
                                                    324/207.12
2021/0302246 A1* 9/2021 Fröhlich ................. G01L 3/104
(Continued)

FOREIGN PATENT DOCUMENTS

JP       2016-114405 A      6/2016
KR   10-2012-0010696 A      2/2012
(Continued)

OTHER PUBLICATIONS

International Search Report dated Jul. 28, 2022 in International Application No. PCT/KR2022/006021.

Primary Examiner — Son T Le
(74) Attorney, Agent, or Firm — Saliwanchik, Lloyd & Eisenschenk

(57) ABSTRACT

An embodiment may provide a sensing device comprising: a rotor; a stator arranged to correspond to the rotor; and a first collector arranged on the upper side of the stator and a second collector arranged on the lower side of the stator, wherein the first collector comprises a first unit collector including a first plate and a first leg, and a second unit collector including a second plate and a second leg. The second collector comprises a third unit collector including a third plate and a third leg, and a fourth unit collector including a fourth plate and a fourth leg. The first plate and the second plate are spaced apart from each other, and the third plate and the fourth plate are spaced apart from each other.

7 Claims, 18 Drawing Sheets

(58) Field of Classification Search
CPC ....... G01L 3/101; G01L 3/104; G01L 5/0023; G01L 5/22; G01L 5/221; H02K 1/2753; H02K 1/146; G01D 3/028; G01D 5/12; G01D 2205/40; B62D 5/04; B62D 6/10
See application file for complete search history.

(56) References Cited

U.S. PATENT DOCUMENTS

| | | | |
|---|---|---|---|
| 2023/0109220 A1* | 4/2023 | Dreher | B62D 15/0215 324/207.12 |
| 2023/0314250 A1* | 10/2023 | Fröhlich | B62D 15/0215 73/862.325 |

FOREIGN PATENT DOCUMENTS

| | | |
|---|---|---|
| KR | 10-2012-0049250 A | 5/2012 |
| KR | 10-2012-0069931 A | 6/2012 |
| KR | 10-1315717 B1 | 10/2013 |

* cited by examiner (a)

(b)

(a)

(b)

(a)

(b)

(a)

(b)

(a)

(b)

a : 1.13
b : 2.13

(a)

a : 1.54
b : 2.54

(b)

a : 1.58
b : 2.58

(c)

SENSING DEVICE

CROSS-REFERENCE TO RELATED APPLICATIONS

This application is the U.S. national stage application of International Patent Application No. PCT/KR2022/006021, filed Apr. 27, 2022, which claims the benefit under 35 U.S.C. § 119 of Korean Application Nos. 10-2021-0054388, filed Apr. 27, 2021; and 10-2021-0113914, filed Aug. 27, 2021; the disclosures of each of which are incorporated herein by reference in their entirety.

TECHNICAL FIELD

The present invention relates to a sensing device.

BACKGROUND ART

A power steering system (an electronic power system, hereinafter referred to as an "EPS") drives a motor by an electronic control unit according to driving conditions to ensure turning stability and provide rapid restoration, thereby enabling drivers to safely drive.

The EPS includes a sensor device that measures a torque and a steering angle of a steering shaft to provide appropriate torque. The sensor device is a device that measures the degree of twist of a torsion bar. The torsion bar is an input shaft which connects the steering shaft to a handle, an output shaft which connects a power transmission component on a wheel side, and a member that connects the input shaft and the output shaft.

The sensor device includes a housing, a rotor, a stator including stator teeth, and a collector. In this case, the collector is disposed outside the stator teeth. Therefore, when an external magnetic field is generated, there is a problem that the collector acts as a path for the external magnetic field, affecting a magnetic flux value of the sensor. When the sensor is affected in this way, an output value of the sensor device changes, causing a problem in which the degree of twist of the torsion bar cannot be accurately measured.

Technical Problem

The present invention is directed to providing a sensing device capable of compensating for the amount of change in an output value of a sensor due to external magnetism.

Technical Solution

One aspect of the present invention provides a sensing device including a rotor, a stator disposed to correspond to the rotor, and a first collector disposed on an upper side of the stator and a second collector disposed on a lower side of the stator, in which the first collector includes a first unit collector including a first plate and a first leg and a second unit collector including a second plate and a second leg, the second collector includes a third unit collector including a third plate and a third leg and a fourth unit collector including a fourth plate and a fourth leg, and the first plate and the second plate are spaced apart from each other, and the third plate and the fourth plate are spaced apart from each other.

Another aspect of the present invention provides a sensing device including a rotor, a stator disposed to correspond to the rotor, and a first collector disposed on an upper side of the stator and a second collector disposed on a lower side of the stator, in which the first collector includes a first unit collector and a second unit collector, the first unit collector includes a first plate and a first leg protruding from the first plate and extending in a direction toward the second collector, the second unit collector includes a second plate and a second leg protruding from the second plate and extending in a direction toward the second collector, and the first unit collector and the second unit collector are spaced apart from each other.

Still another aspect of the present invention provides a sensing device including a rotor, a stator disposed to correspond to the rotor, a first collector disposed on an upper side of the stator and a second collector disposed on a lower side of the stator, and a first sensor and a second sensor disposed between the first collector and the second collector, in which the first collector includes a first unit collector and a second unit collector, and compensate at least one sensing value of the first sensor and the second sensor based on a difference between a sensing value of the first sensor by magnetic flux transmitted to the first unit collector and a sensing value of the second sensor by magnetic flux transmitted to the second unit collector.

Advantageous Effects

An embodiment has an advantage of securing performance of a sensor device by compensating for an amount of change in an output value due to external magnetism by varying a magnetic resistance of a collector.

An embodiment has an advantage of reducing a size of a compensation value by utilizing the difference in magnetic flux values between collectors even when external magnetism significantly increases.

An embodiment has an advantage of being able to compensate for an amount of change in an output value due to external magnetism without significantly changing an existing collector structure.

MODES OF THE INVENTION

Hereinafter, a direction perpendicular to an axial direction of a sensing device is referred as a radial direction, and a direction along a circle with a radial radius centered on an axis is referred to as a circumferential direction.

Figure 1:
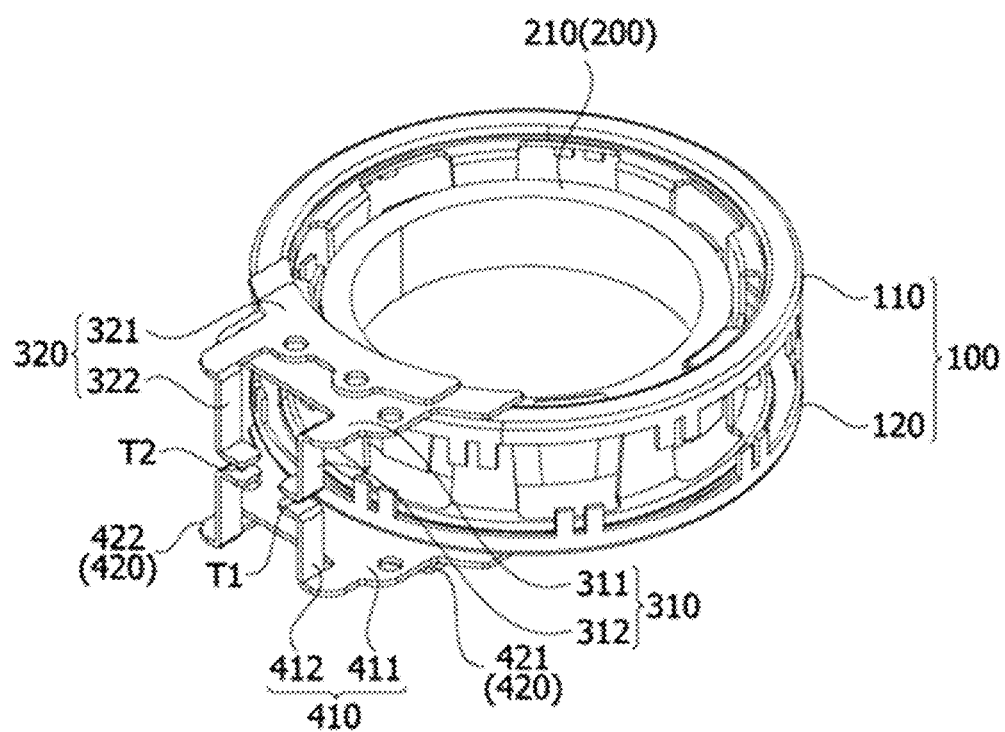
FIG. 1 is a perspective view illustrating a sensing device according to an embodiment.
Figure 2:
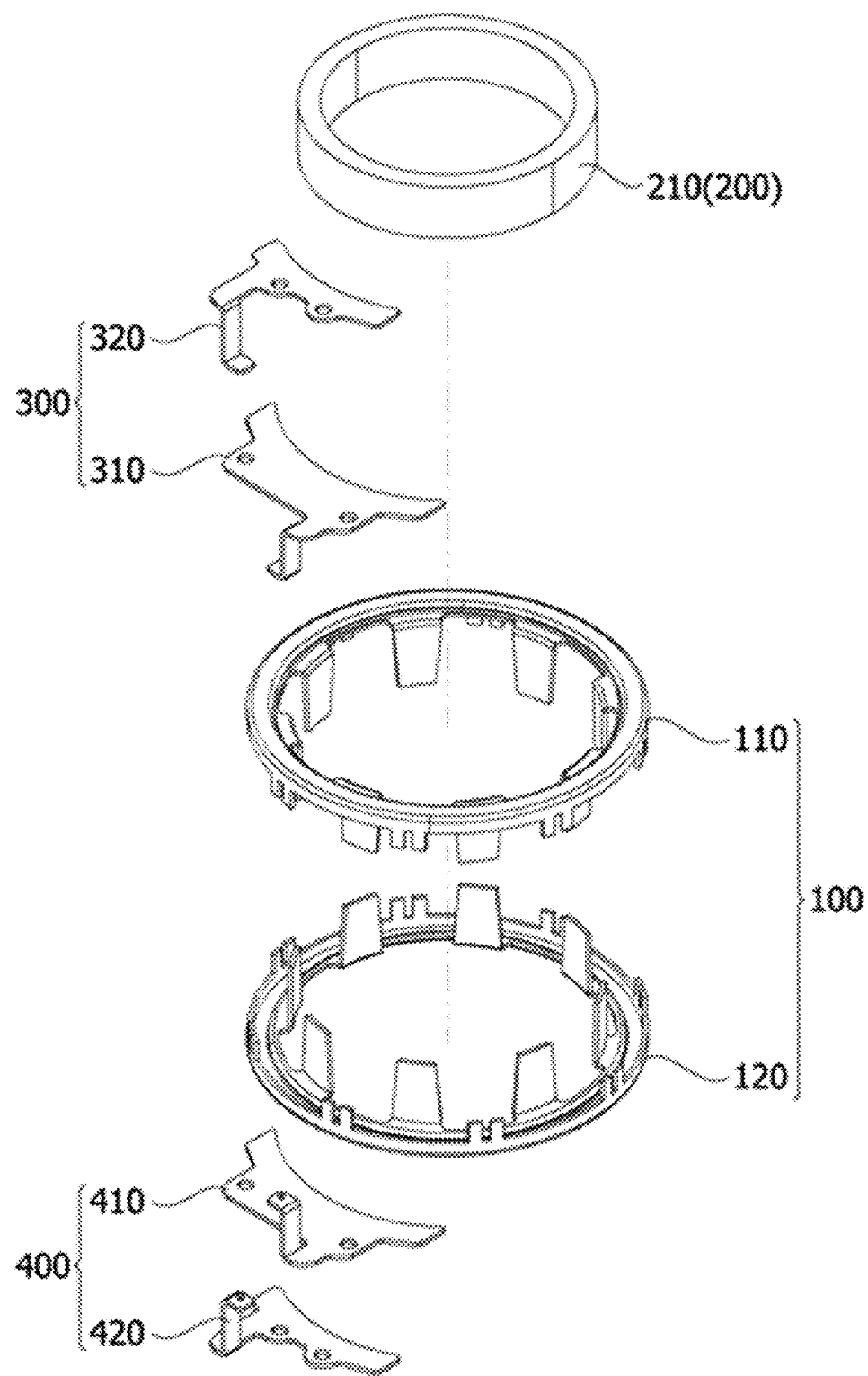
FIG. 2 is an exploded view of the sensing device illustrated in FIG. 1.
Figure 3:
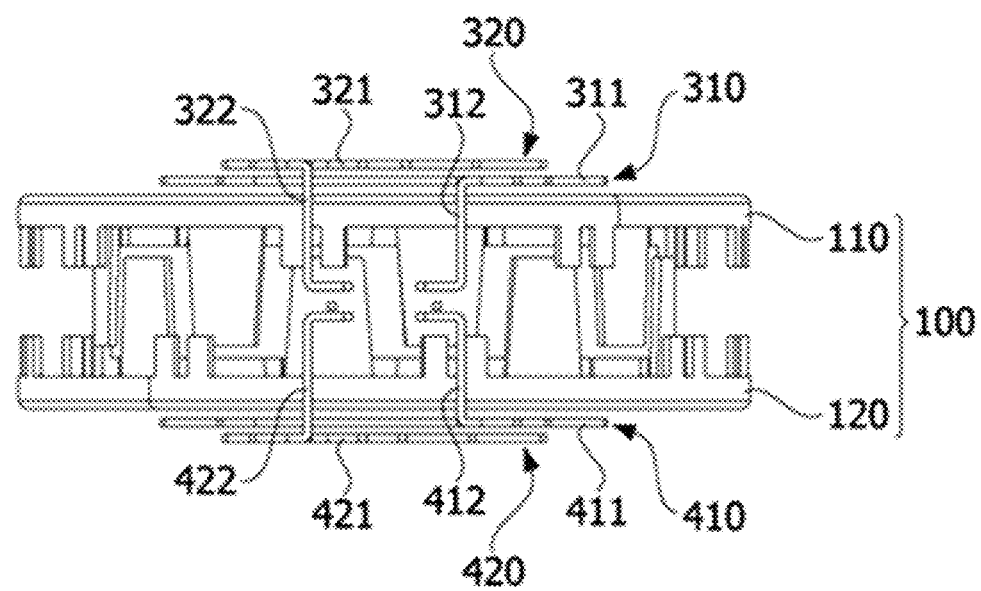
FIG. 3 is a front view of the sensing device illustrated in FIG. 1.

FIG. 1 is a perspective view illustrating a sensing device according to an embodiment, FIG. 2 is an exploded view of the sensing device illustrated in FIG. 1, and FIG. 3 is a front view of the sensing device illustrated in FIG. 1.

Referring to FIGS. 1 to 3, the sensing device according to the embodiment may include a stator 100, a rotor 200 partially disposed on the stator 100, a first collector 300, a second collector 400, a first sensor T1, and a second sensor T2.

Here, the stator 100 may be connected to an output shaft (not illustrated), and the rotor 200, at least a portion of which is rotatably disposed on the stator 100, may be connected to an input shaft (not illustrated), but is not necessarily limited thereto. In this time, the rotor 200 may be disposed to rotate with respect to the stator 100. Hereinafter, inside may refer to a direction disposed toward a center based on the radial direction, and outside may refer to a direction opposite to the inside.

The stator 100, the first collector 300, and the second collector 400 may be fixed to a separate holder or housing.

The stator 100 may include a first stator tooth 110 and a second stator tooth 120.

The rotor 200 may include a magnet 210. The magnet 210 may be disposed inside the stator 100. The magnet 210 may be connected to the input shaft through a separate holder.

Each of the first sensor T1 and the second sensor T2 detects a change in a magnetic field that is generated between the stator 100 and the rotor 200. The first sensor T1 and the second sensor T2 may be Hall ICs. Based on the detected change in the magnetic field, the sensing device measures torque.

The first collector 300 may be disposed on an upper side of the stator 100. The second collector 400 may be displaced on a lower side of the stator 100. The first sensor T1 is disposed to correspond to the first collector 300 and the second collector 400. The second sensor T2 is also disposed to correspond to the first collector 300 and the second collector 400.

The first collector 300 may include a first unit collector 310 and a second unit collector 320. The first unit collector 310 is a collector that is relatively less affected by external magnetism, and the second unit collector 320 is a collector that is relatively more affected by external magnetism. A difference in sensing value between the first unit collector 310 and the second unit collector 320 is used to compensate for the amount of change in the sensing value due to the external magnetic field.

The first unit collector 310 may include a first plate 311 and a first leg 312. The first leg 312 is disposed to protrude from the first plate 311 and extend in a direction toward the second collector 400. The first leg 312 is disposed to correspond to the first sensor T1.

The second unit collector 320 may include a second plate 321 and a second leg 322. The second plate 321 is disposed to overlap the first plate 311 in the axial direction. The second plate 321 may be disposed on an upper side of the first plate 311. The second leg 322 is disposed to protrude from the second plate 321 and extend in a direction toward the second collector 400. The second leg 322 is disposed to correspond to the second sensor T2.

The second collector 400 may include a third unit collector 410 and a fourth unit collector 420. The third unit collector 410 is a collector that is relatively less affected by external magnetism, and the fourth unit collector 420 is a collector that is relatively more affected by external magnetism. A difference in sensing value between the third unit collector 410 and the fourth unit collector 420 is used to compensate for the amount of change in the sensing values due to the external magnetic field.

The third unit collector 410 may include a third plate 411 and a third leg 412. The third leg 412 is disposed to protrude from the third plate 411 and extend in a direction toward the first collector 300. The third leg 412 is disposed to correspond to the first sensor T1.

The fourth unit collector 420 may include a fourth plate 421 and a fourth leg 422. The fourth plate 421 is disposed to overlap the third plate 411 in the axial direction. The third plate 411 may be disposed on a lower side of the fourth plate 421. The fourth leg 422 is disposed to protrude from the fourth plate 421 and extend in a direction toward the first collector 300. The fourth leg 422 is disposed to correspond to the second sensor T2.

Figure 4:
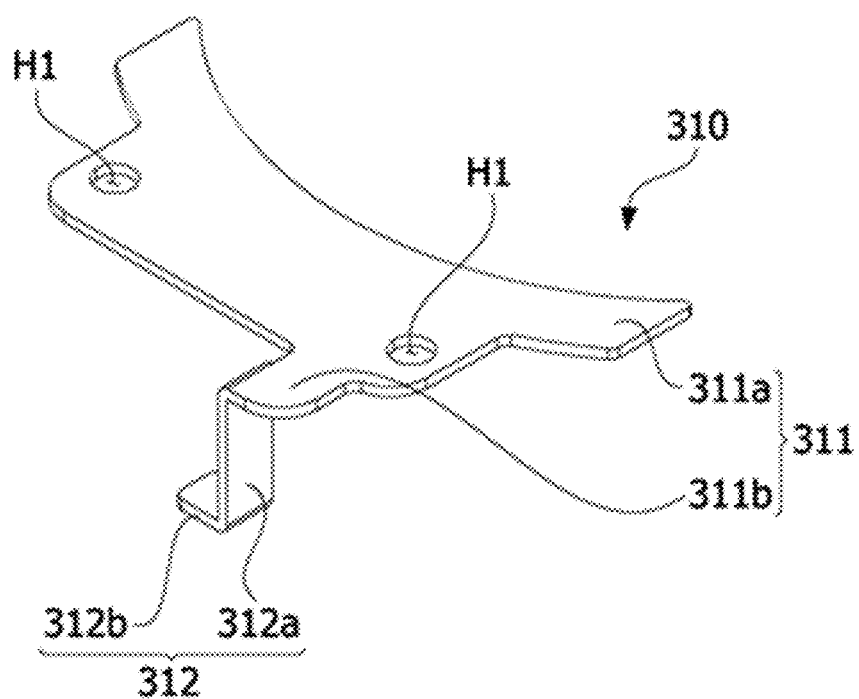
FIG. 4 is a perspective view illustrating a first unit collector.

FIG. 4 is a perspective view illustrating the first unit collector 310.

Referring to FIG. 4, the first unit collector 310 may include the first plate 311 and the first leg 312. The first plate 311 is a flat member and may include a first body 311a and a first extension portion 311b. The first body 311a may have a curved inner surface. The first body 311a may include a plurality of fastening holes H1 for fixing the first unit collector 310. The first extension portion 311b is disposed to extend outward from the first body 311a. This first plate 311 may be fixed to a separate housing. The first leg 312 may be formed by being bent from the first extension portion 311b. The first leg 312 may include a first leg body 312a and a first tip 312b. The first leg body 312a is disposed to be bent downward from the first extension portion 311b. Additionally, the first tip 312b is bent in a circumferential direction on the first leg body 312a and disposed to face the first sensor T1.

Figure 5:
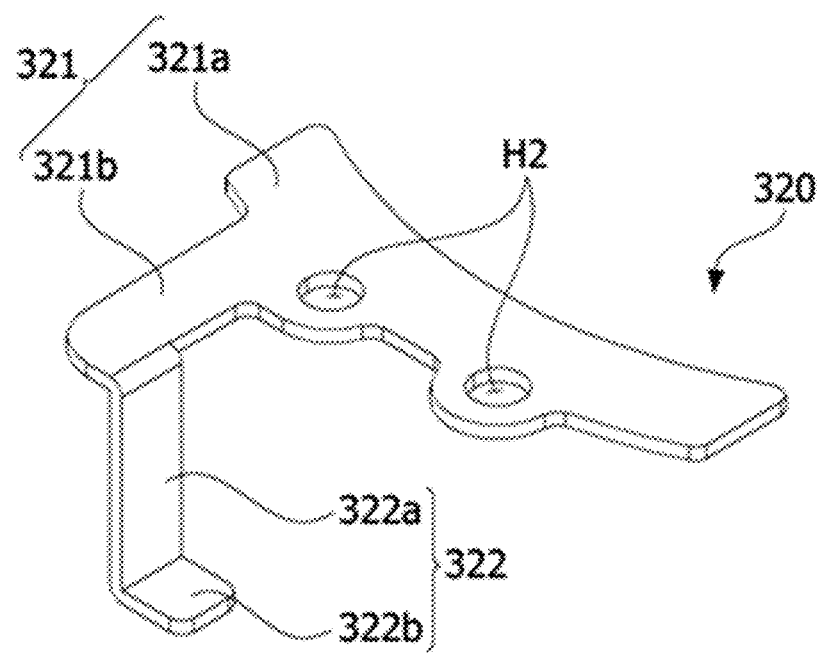
FIG. 5 is a perspective view illustrating a second unit collector.

FIG. 5 is a perspective view illustrating the second unit collector 320.

Referring to FIG. 5, the second unit collector 320 may include the second plate 321 and the second leg 322. The second plate 321 is a flat member and may include a second body 321a and a second extension portion 321b. The second body 321a may have a curved inner surface. The second body 321a may include a plurality of fastening holes H2 for fixing the second unit collector 320. The second extension portion 321b is disposed to extend outward from the second body 321a. This second plate 321 may be fixed to a separate housing. The second leg 322 may be formed by being bent from the second extension portion 321b. The second leg 322 may include a second leg body 322a and a second tip 322b. The second leg body 322a is disposed to be bent downward from the second extension portion 321b. Additionally, the second tip 322b is bent from the second leg body 322a and disposed to face the second sensor T2.

Figure 6:
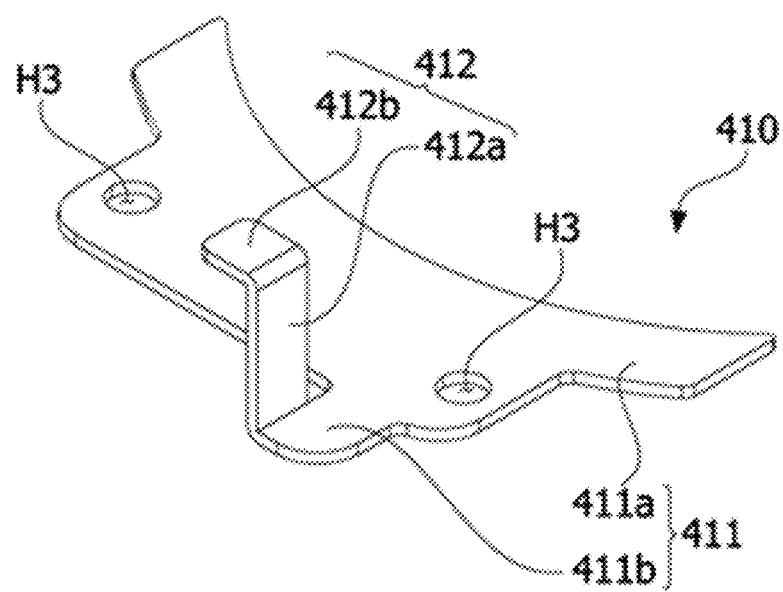
FIG. 6 is a perspective view illustrating a third unit collector.

FIG. 6 is a perspective view illustrating the third unit collector 410.

Referring to FIG. 6, the third unit collector 410 may include the third plate 411 and the third leg 412. The third plate 411 is a flat member and may include a third body 411a and a third extension portion 411b. The third body 411a may have a curved inner surface. The third body 411a may include a plurality of fastening holes H3 for fixing the third unit collector 410. The third extension portion 411b is disposed to extend outward from the third body 411a. This third plate 411 may be fixed to a separate housing. The third leg 412 may be formed by being bent from the third extension portion 411b. The third leg 412 may include a third leg body 412a and a third tip 412b. The third leg body 412a is disposed to be bent upward from the third extension portion 411b. Additionally, the third tip 412b is bent in the circumferential direction on the third leg body 412a and disposed to face the first sensor T1. This third unit collector 410 may have the same shape and size as the first unit collector 310.

Figure 7:
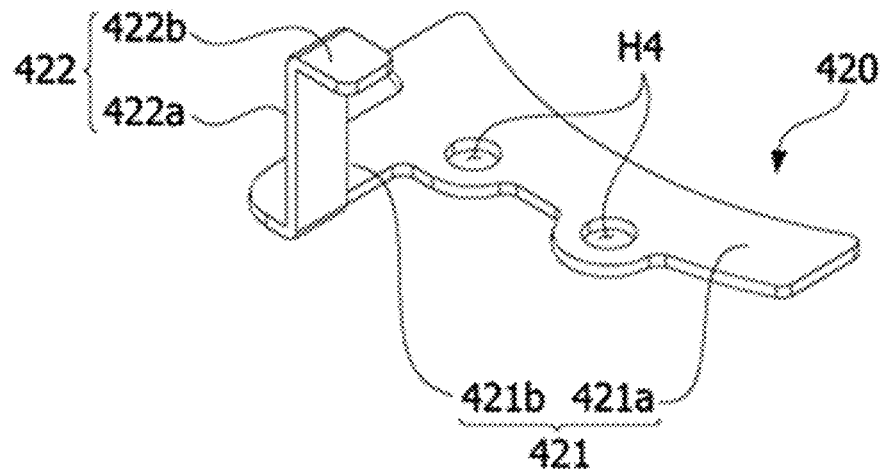
FIG. 7 is a perspective view illustrating a fourth unit collector.

FIG. 7 is a perspective view illustrating the fourth unit collector 420.

Referring to FIG. 7, the fourth unit collector 420 may include a fourth plate 421 and a fourth leg 422. The fourth plate 421 is a flat member and may include a fourth body 421a and a fourth extension portion 421b. The fourth body 421a may have a curved inner surface. The fourth body 421a may include a plurality of fastening holes H4 for fixing the fourth unit collector 420. The fourth extension portion 421b is disposed to extend outward from the fourth body 421a. This fourth plate 421 may be fixed to a separate housing. The fourth leg 422 may be formed by being bent from the fourth extension portion 421b. The fourth leg 422 may include a fourth leg body 422a and a fourth tip 422b. The fourth leg body 422a is disposed to be bent upward from the fourth extension portion 421b. Additionally, the fourth tip 422b is bent in the circumferential direction on the fourth leg body 422a and disposed to face the second sensor T2. This fourth unit collector 420 may have the same shape and size as the second unit collector 320.

Figure 8:
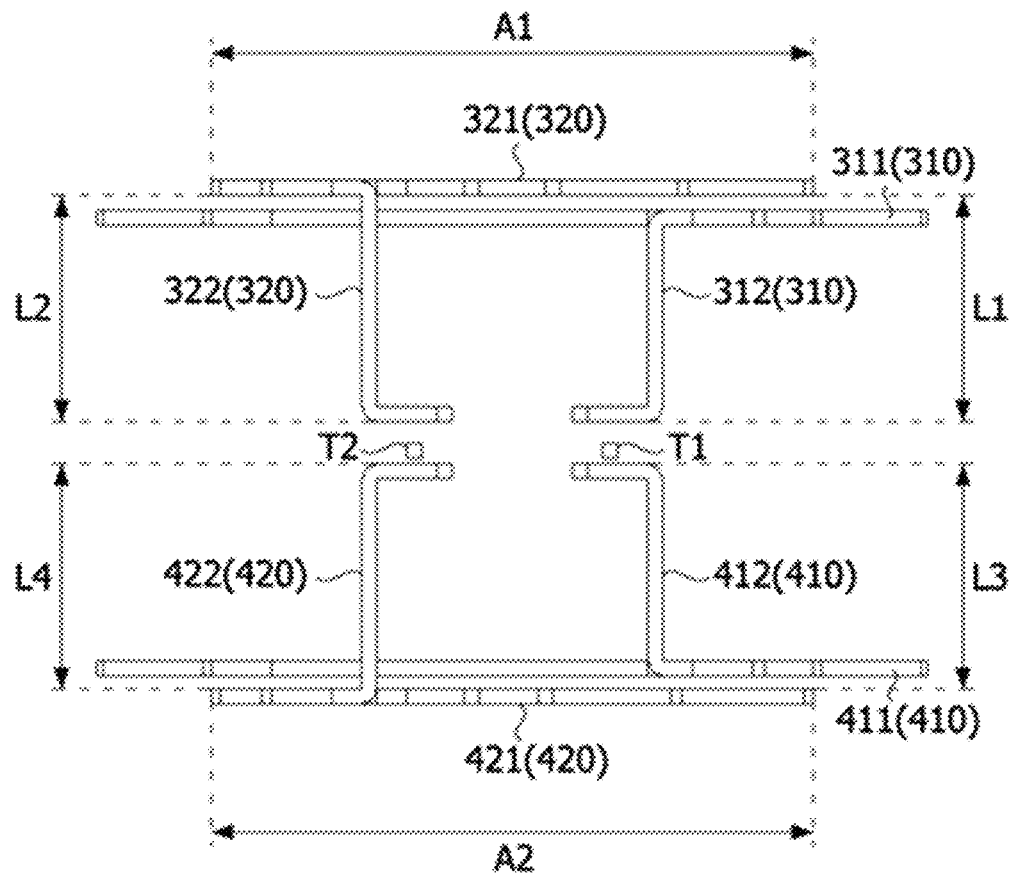
FIGS. 8 and 9 are views illustrating the first unit collector, the second unit collector, the third unit collector, and the fourth unit collector.
Figure 9:
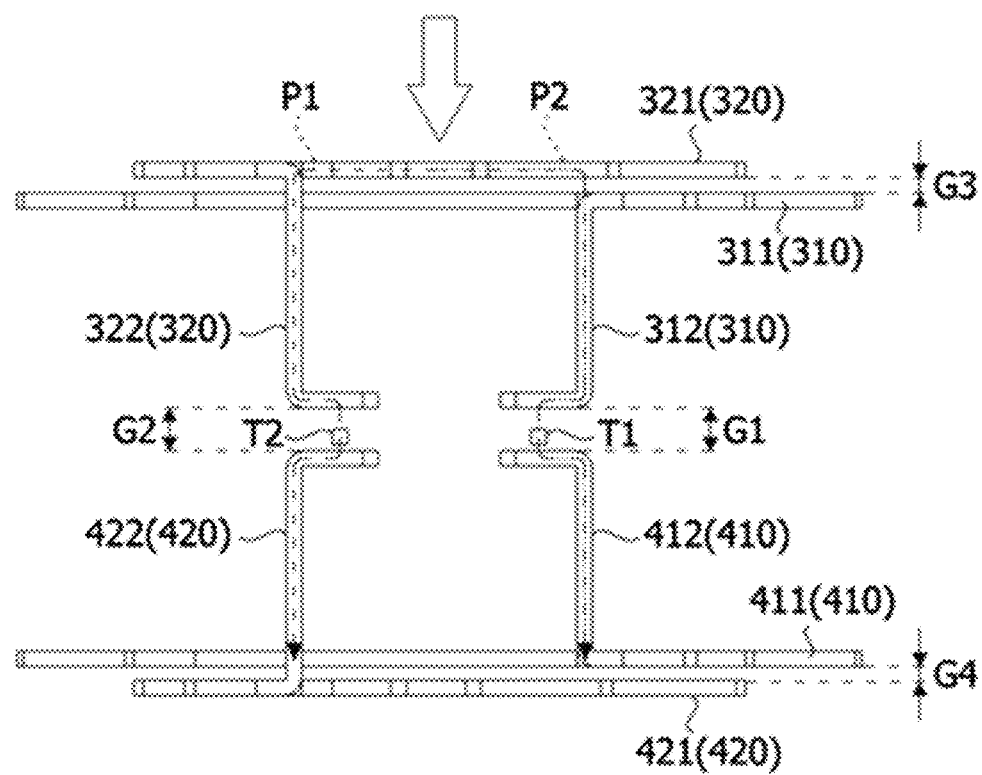

FIGS. 8 and 9 are views illustrating the first unit collector 310, the second unit collector 320, the third unit collector 410, and the fourth unit collector 420.

Referring to FIGS. 1, 8, and 9, the first collector 300 may be disposed on one side of the first sensor T1 and the second sensor T2 in the axial direction. The second collector 400 may be disposed on the other side of the first sensor T1 and the second sensor T2. In the axial direction, a first gap G1 is disposed between the first leg 312 of the first collector 300 and the third leg 412 of the second collector 400. The first leg 312 and the third leg 412 are disposed to overlap in the axial direction. Additionally, a second gap G2 is disposed between the second leg 322 of the first collector 300 and the fourth leg 422 of the second collector 400 in the axial direction. The second leg 322 and the fourth leg 422 are disposed to overlap in the axial direction. Each of the first gap G1 and the second gap G2 acts as magnetic resistance.

The first plate 311 of the first unit collector 310 and the second plate 321 of the second unit collector 320 form an overlap area A1 in the axial direction. The second plate 321 is disposed on the upper side of the first plate 311 to block external magnetism from flowing toward the first plate 311 and to guide the external magnetism to the first leg 312. A third gap G3 is disposed between the first plate 311 and the second plate 321 in the axial direction. This gap acts as magnetic resistance in the first unit collector 310.

The third plate 411 of the third unit collector 410 and the fourth plate 421 of the fourth unit collector 420 may form an overlap area A2 in the axial direction. The fourth plate 421 is disposed on a lower side of the third plate 411 to block external magnetism from flowing toward the third plate 411 and guide the external magnetism to the fourth leg 422. A fourth gap G4 is disposed between the third plate 411 and the fourth plate 421 in the axial direction. This gap acts as magnetic resistance in the third unit collector 410.

When external magnetism is generated, the external magnetism flows along a second path P2 passing through the second plate 321, the second leg 322, the second sensor T2, and the fourth leg 422. In addition, the external magnetism flows along a first path P1 passing through the first plate 311, the first leg 312, the first sensor T1, and the third leg 412.

The first path P1 has only magnetic resistance by the second gap G2, while the second path P2 has additional magnetic resistance by the third gap G3 in addition to the first gap G1. Accordingly, a relatively large amount of magnetic flux flows through the first path P1. Therefore, corresponding to external magnetism, a difference occurs between a sensing value measured by the first sensor T1 and a sensing value measured by the second sensor T2.

Although not illustrated in the drawing, when the external magnetism flows through the second collector 400, a magnetic flux flow is formed in the same way as when the external magnetism flows through the first collector 300, and thus a difference occurs between the sensing value measured by the first sensor T1 and the sensing value measured by the second sensor T2.

In this first collector 300, first, the first plate 311 is covered with the second plate 321 to induce the external magnetism flowing toward the first leg 312 to flow toward the second leg 322, and second, resistance to the external magnetism is formed through the third gap G3 formed between the first plate 311 and the second plate, 321, thereby making the difference between the sensing value measured by the first sensor T1 and the sensing value measured by the second sensor T2. This is the same for the second collector 400.

A size of the third gap G3 may be 2.0 mm to 3.5 mm. When the size of the third gap G3 is less than 2.0 mm, the magnetic resistance for the third gap G3 is not sufficient, and when the size of the third gap G3 is larger than 3.5 mm, there is a limit to the compensation coefficient and there is a problem that an axial length of the sensing device increases.

Meanwhile, an axial length L2 of the second leg 322 is longer than an axial length L1 of the first leg 312. Additionally, an axial length L3 of the third leg 412 is longer than an axial length L4 of the fourth leg 422. For example, a ratio of the axial length L1 of the first leg 312 to the axial length L2 of the second leg 322 may be 1:1.1 to 1:1.2. Additionally, a ratio of the third length to the fourth leg 422 in the axial direction may be 1:1.1 to 1:1.2.

Figure 10:
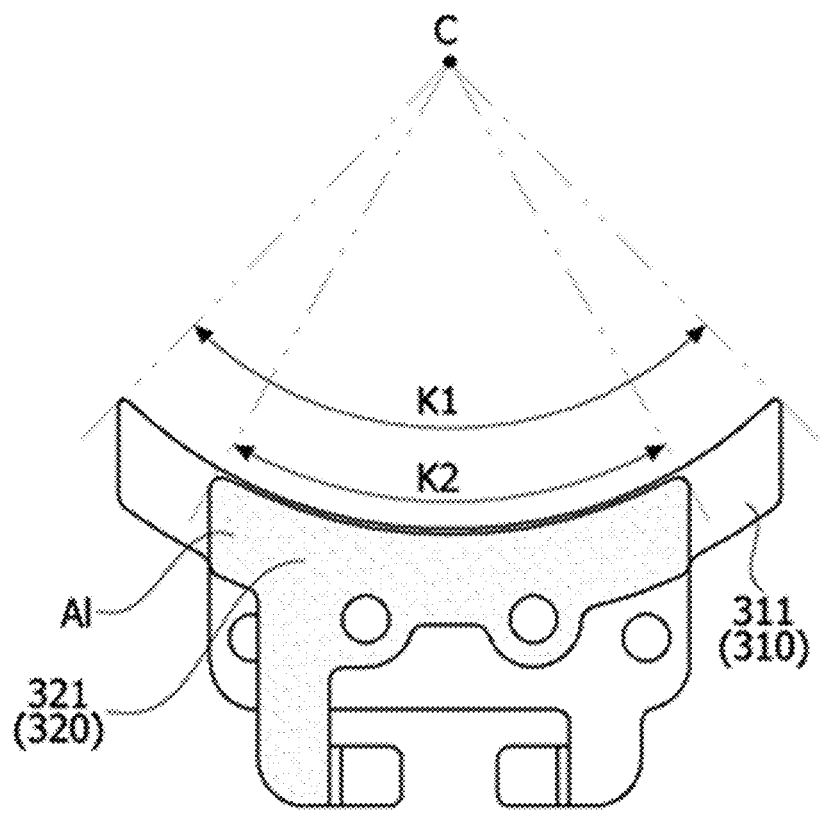
FIG. 10 is a view illustrating the first unit collector and the second unit collector.

FIG. 10 is a view illustrating the first unit collector 310 and the second unit collector 320.

Referring to FIG. 10, the size of the first unit collector 310 is set in consideration of the overlap area and position with the second unit collector 320. For example, when viewed in the axial direction, an area of the overlap area A1 of the first plate 311 and the second plate 321 may be within 50% to 100% of an area of the first plate 311. Only when the overlap area A1 of the first plate 311 and the second plate 321 is at least 50% of the area of the first plate 311, a meaningful difference value between the sensing value measured by the first sensor T1 and the sensing value measured by the second sensor T2 may be derived. Although not illustrated in the drawing, when viewed in the axial direction, an area of the overlap area of the third plate 411 and the fourth plate 421 may also be within 50% to 100% of an area of the third plate 411.

Meanwhile, a ratio of a circumferential length K1 of the inner surface of the first plate 311 to a circumferential length K2 of the inner surface of the second plate 321 may be within 1:1.3 to 1:1.7. Additionally, although not illustrated in the drawing, a ratio of a circumferential length of the inner surface of the third plate 411 to a circumferential length of the inner surface of the fourth plate 421 may also be within 1:1.3 to 1:1.7.

Figure 11:
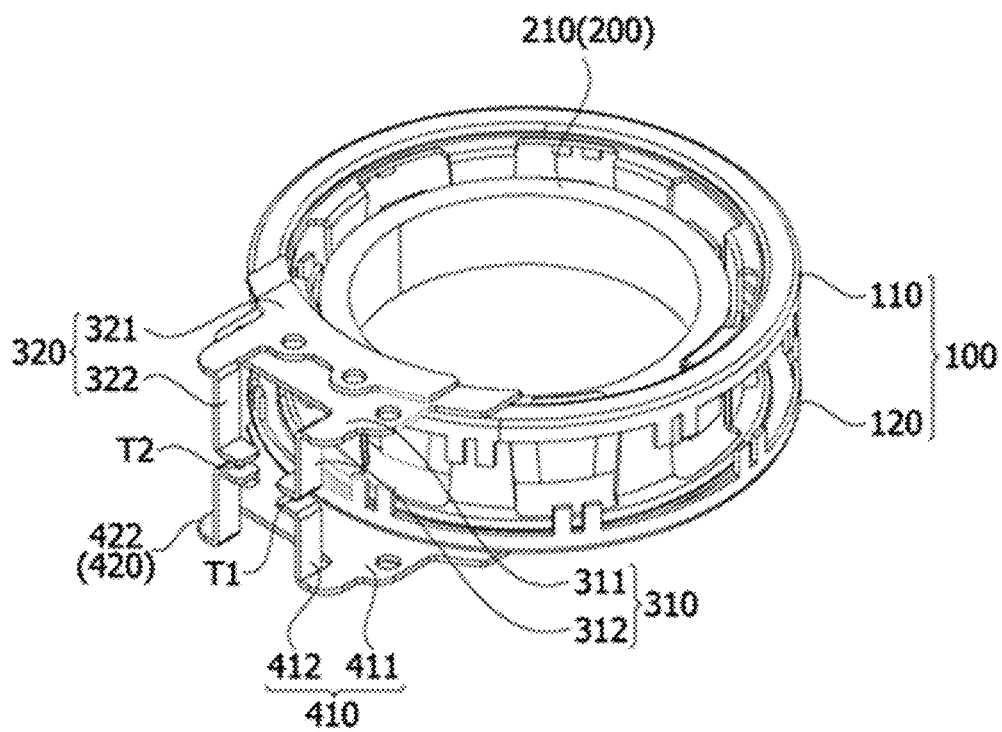
FIG. 11 is a view illustrating a sensing device according to another embodiment.
Figure 12:
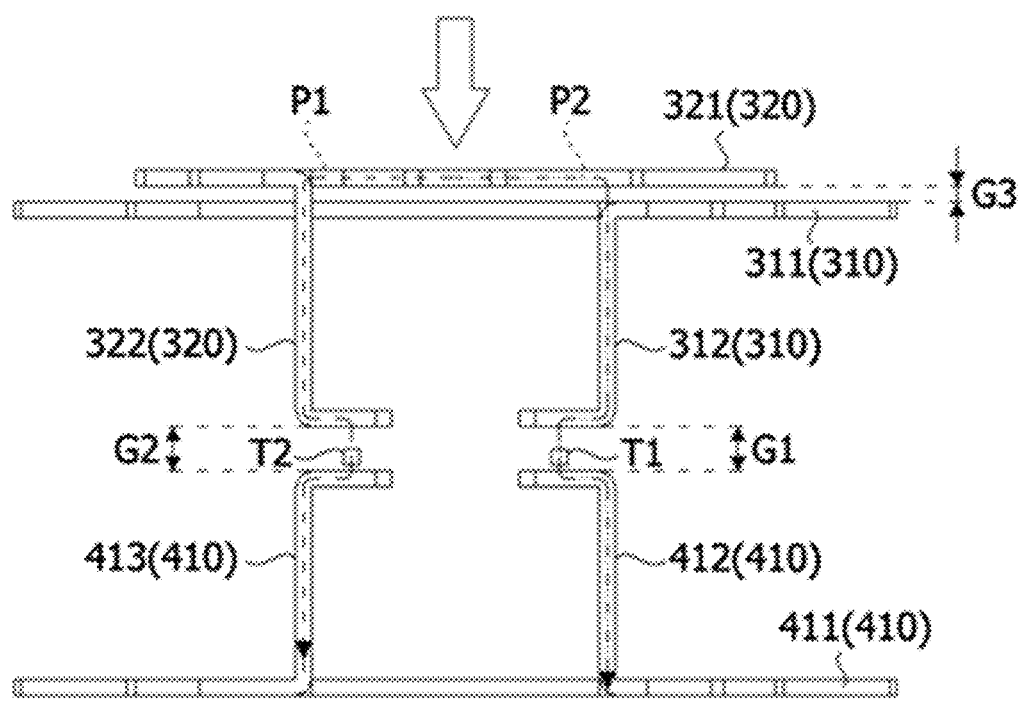
FIG. 12 is a view illustrating a first unit collector, a second unit collector, and a third unit collector illustrated in FIG. 11.

FIG. 11 is a view illustrating a sensing device according to another embodiment, and FIG. 12 is a view illustrating a first unit collector 310, a second unit collector 320, and a third unit collector 410 illustrated in FIG. 11.

Referring to FIGS. 11 and 12, the sensing device according to the other embodiment may include a first unit collector 310 and a second unit collector 320 as the first collector 300 and include only a third unit collector 410 as the second collector 400. That is, a collector corresponding to external magnetism may be disposed on only one side of the stator 100.

For example, only the third unit collector 410 may be disposed on the lower side of the stator 100, and the third unit collector 410 may include a third plate 411, a third leg 412, and a fifth leg 413. The third leg 412 extends from one side of the third plate 411, and the fifth leg 413 extends from the other side of the third plate 411.

In an axial direction, a second gap G2 is disposed between a second leg 322 of the first collector 300 and the fifth leg 413 of the second collector 400. The second leg 322 and the fifth leg 413 are disposed to overlap in the axial direction.

When external magnetism is generated, the external magnetism flows along a first path P1 passing through a second plate 321, the second leg 322, a second sensor T2, and the fifth leg 413. In addition, the external magnetism flows along a second path P2 passing through the second plate 321, a first plate 311, a first leg 312, a first sensor T1, and the third leg 412.

In this sensing device, a process of compensating for sensing values of the first sensor T1 and the sensing value of the second sensor T2 corresponding to external magnetism is as follows.

The sensing value of the first sensor T1 is compensated for by Equation 1 below.

$$T1c = T1o - a*(T2o - T1o) \qquad \text{[Equation 1]}$$

where T1c is a compensated sensing value of the first sensor T1, T1o is a sensing value of the first sensor T1 before compensation, T2o is a sensing value of the second sensor T2 before compensation, and a is a compensation coefficient corresponding to an axial separation distance (a third gap G3) between the first unit collector 310 and the second unit collector 320 in the first sensor T1.

Additionally, the sensing value of the second sensor T2 is compensated for by Equation 2 below.

$$T2c = T2o - b*(T2o - T1o) \qquad \text{[Equation 2]}$$

where T2c is a compensated sensing value of the second sensor T2, T1o is a sensing value of the first sensor T1 before compensation, T2o is a sensing value of the second sensor T2 before compensation, and b is a compensation coefficient corresponding to an axial separation distance (the third gap G3) between the first unit collector 310 and the second unit collector 320 in the second sensor T2.

a and b may be preset values corresponding to the third gap G3. a and b may also vary depending on the shape of the second unit collector 320 or the third unit collector 410.

Hereinafter, a description will be given based on a case where a is 2.72 and b is 3.72.

Figure 13A:
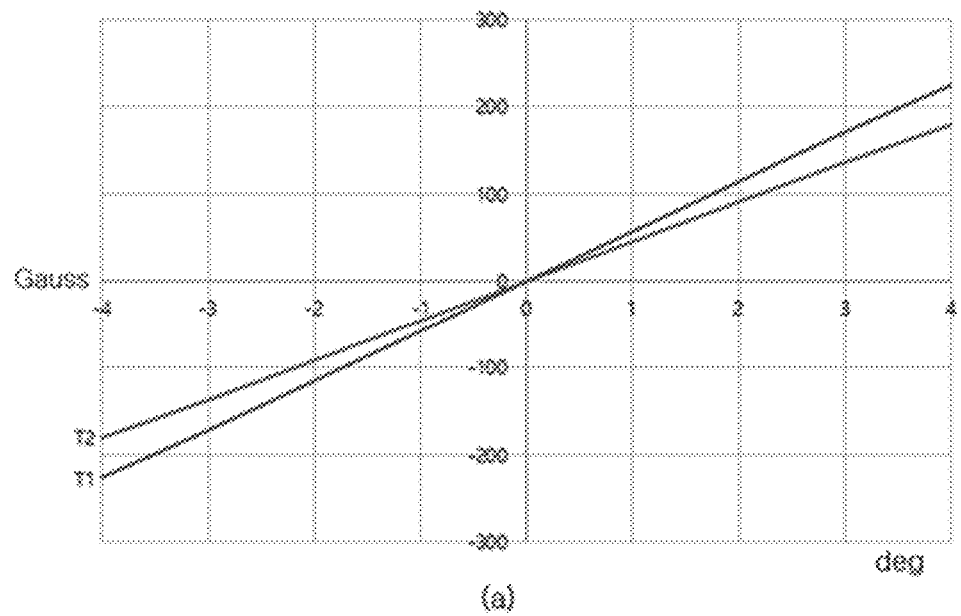
FIGS. 13A and 13B are graphs showing a process of compensating for sensitivity of a first sensor and sensitivity of a second sensor under the condition that there is no external magnetism.
Figure 13B:
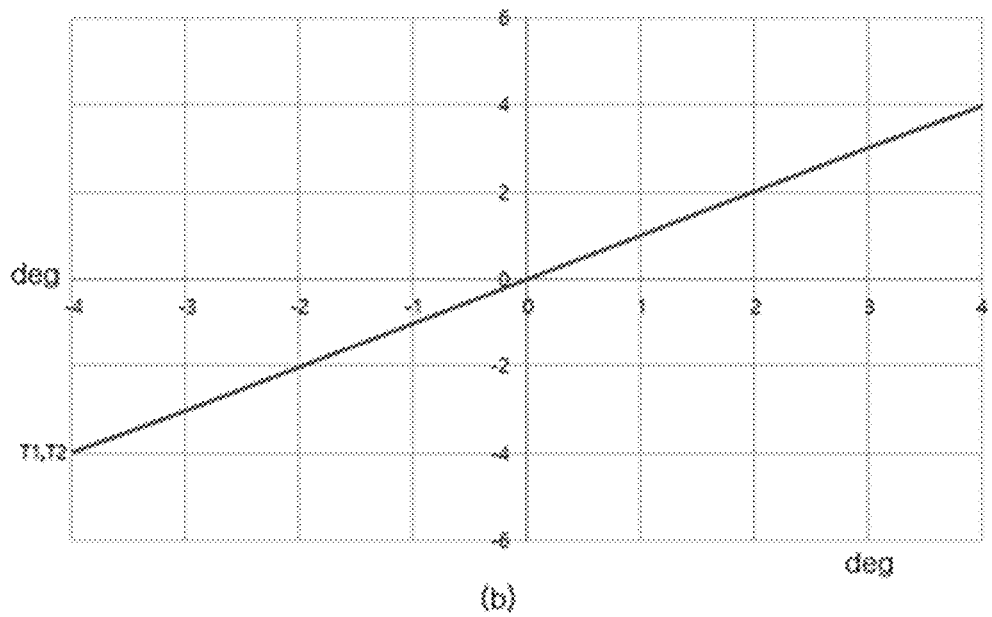

FIGS. 13A and 13B are graphs showing a process of compensating for sensitivity of the first sensor T1 and sensitivity of the second sensor T2 under the condition that there is no external magnetism. As illustrated in FIG. 13A, the first sensor T1 and the second sensor T2 have a difference in sensitivity corresponding to magnetic flux under the condition that there is no external magnetism. The sensitivity of the second sensor T2 is lower than the sensitivity of the first sensor T1. Under the condition that there is no external magnetism, as shown in FIG. 13B, the sensitivity of the first sensor T1 and the sensitivity of the second sensor T2 may be immediately compensated for in a process of outputting the sensing value (output angle) of the first sensor T1 and the sensing value (output angle) of the second sensor T2.

Figure 14A:
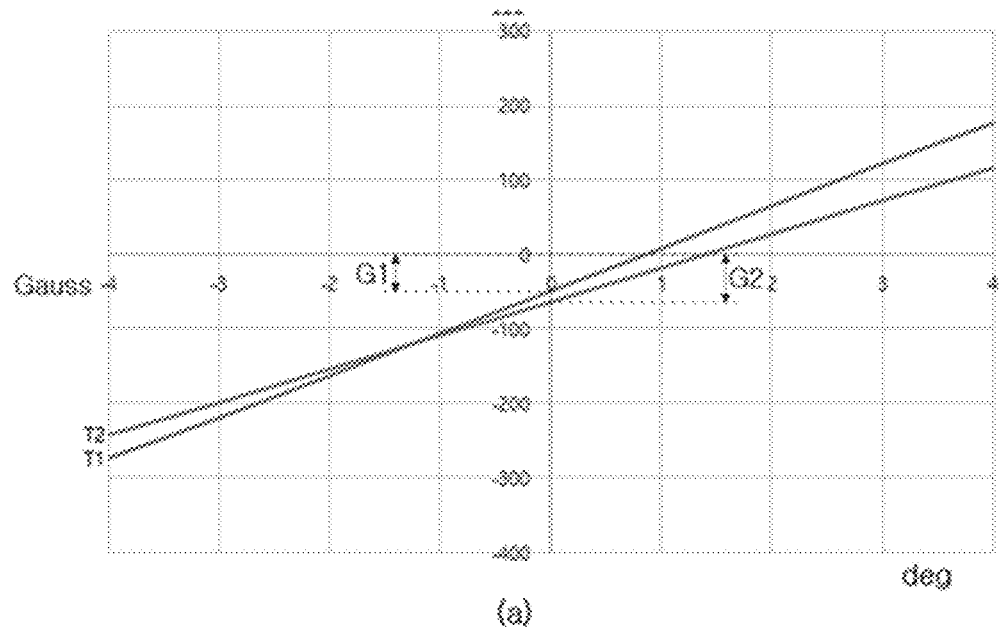
FIGS. 14A and 14B are graphs showing a process of compensating for sensitivity of the first sensor and sensitivity of the second sensor under the condition that there is external magnetism.
Figure 14B:
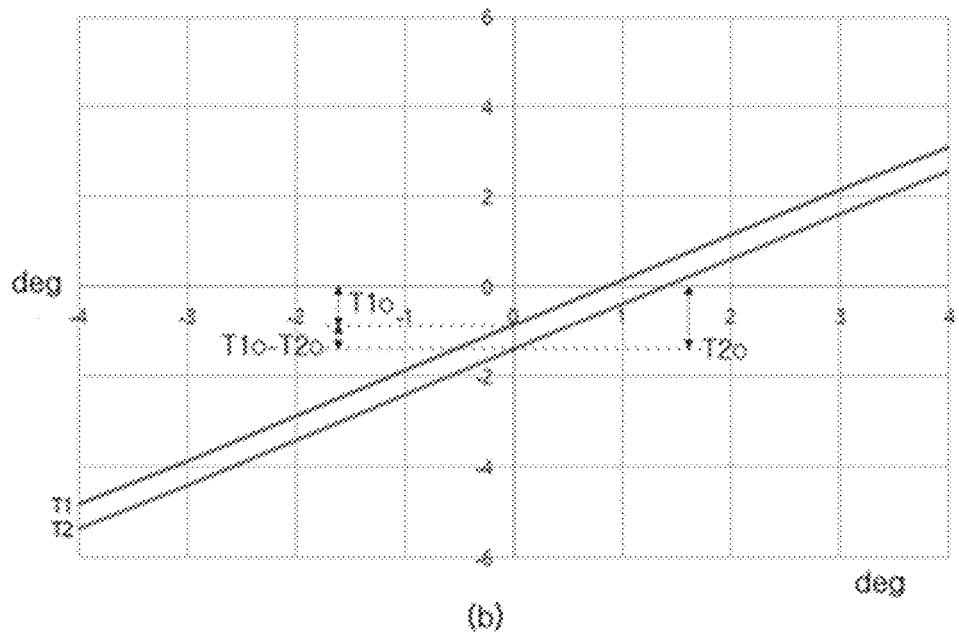

FIGS. 14A and 14B are graphs showing a process of compensating for the sensitivity of the first sensor T1 and the sensitivity of the second sensor T2 under the condition that there is external magnetism.

As shown in FIG. 14A, when there is external magnetism, the first sensor T1 and the second sensor T2 are affected by the external magnetism. Accordingly, an offset G1 occurs in the first sensor T1, and a relatively large offset G2 occurs in the second sensor T2. Therefore, under the condition that there is external magnetism, as shown in FIG. 14B, even after compensating for the sensitivity of the first sensor T1 and the sensitivity of the second sensor T2, an offset occurs in each of the sensing value T1o of the first sensor T1 and the sensing value T2o of the second sensor T2.

By this offset, the sensing value T1o of the first sensor T1 and the sensing value T2o of the second sensor T2 have a certain difference value (T1o−T2o) in an entire angle range.

Figure 15A:
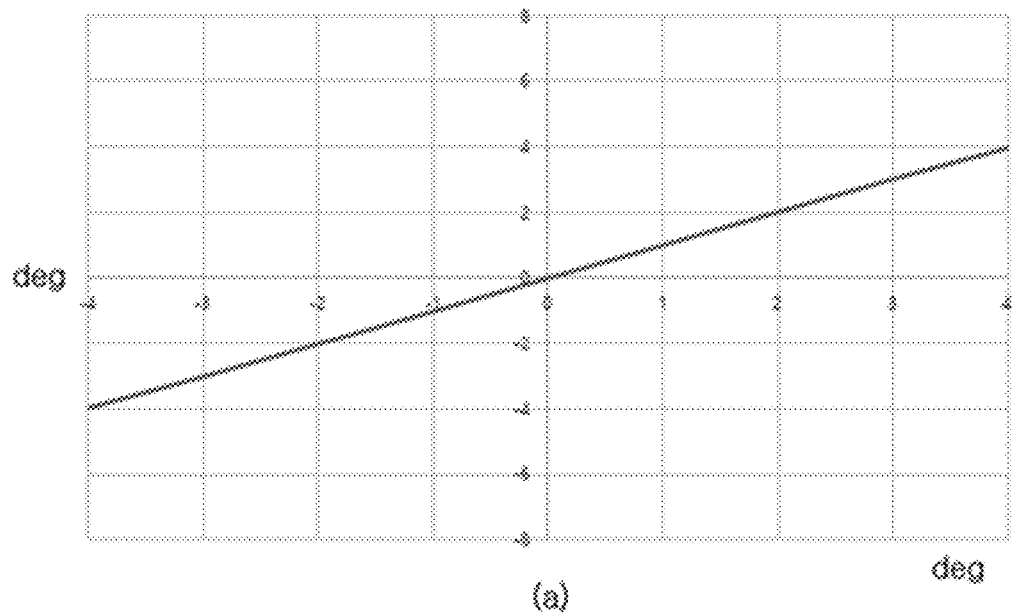
FIGS. 15A and 15B are graphs comparing a sensing value of the first sensor and a sensing value of the second sensor when there is no external magnetism.
Figure 15B:
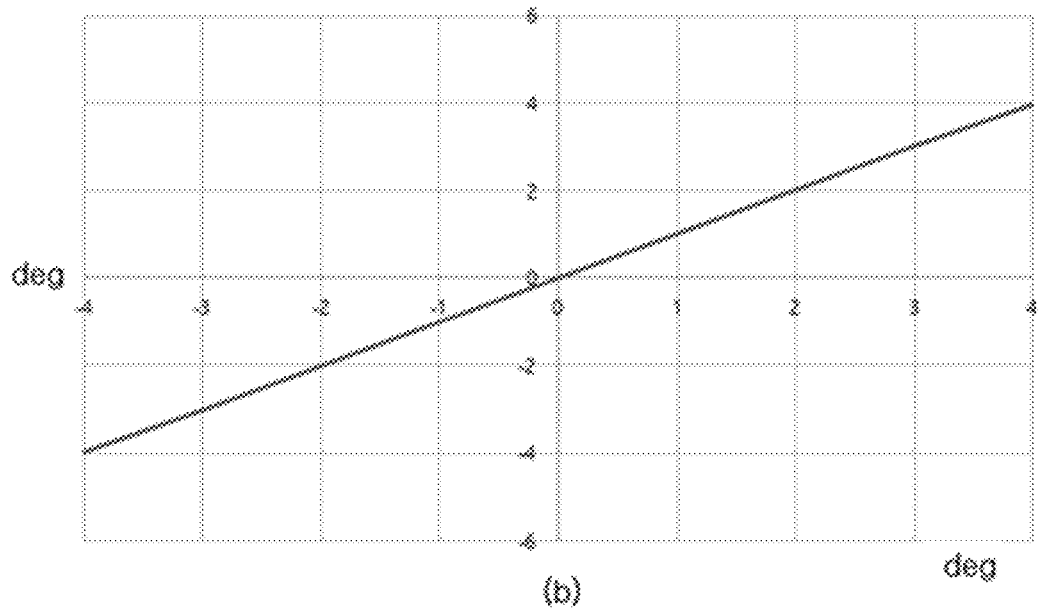

FIGS. 15A and 15B are graphs comparing a sensing value of the first sensor T1 and a sensing value of the second sensor T2 when there is no external magnetism. FIG. 15A shows the sensing value of the first sensor T1 and the sensing value of the second sensor T2 before compensation, and FIG. 15B shows the sensing value of the first sensor T1 and the sensing value of the second sensor T2 after compensation.

When there is no external magnetism, as can be seen in Equations 1 and 2, since the sensing value of the first sensor T1 and the sensing value of the second sensor T2 are the same, that is, T2o−T1o becomes zero, the sensing value of the first sensor T1 before compensation and the sensing value of the first sensor T1 after compensation are the same. Additionally, the sensing value of the second sensor T2 before compensation and the sensing value of the second sensor T2 after compensation are the same.

Figure 16A:
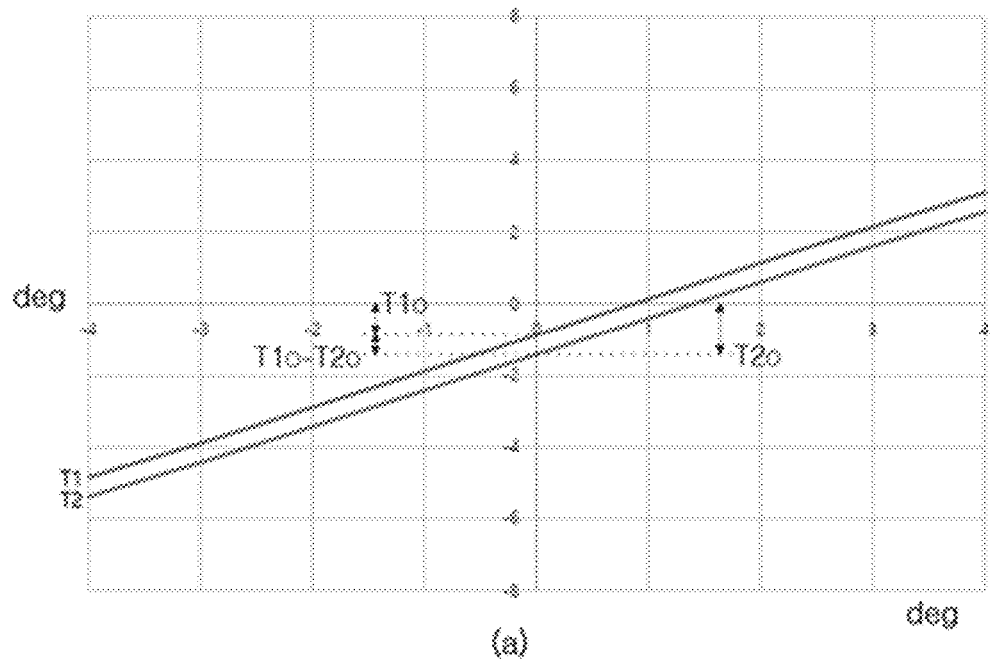
FIGS. 16A and 16B are graphs comparing a sensing value of the first sensor and a sensing value of the second sensor when there is external magnetism (1500 A/m).
Figure 16B:
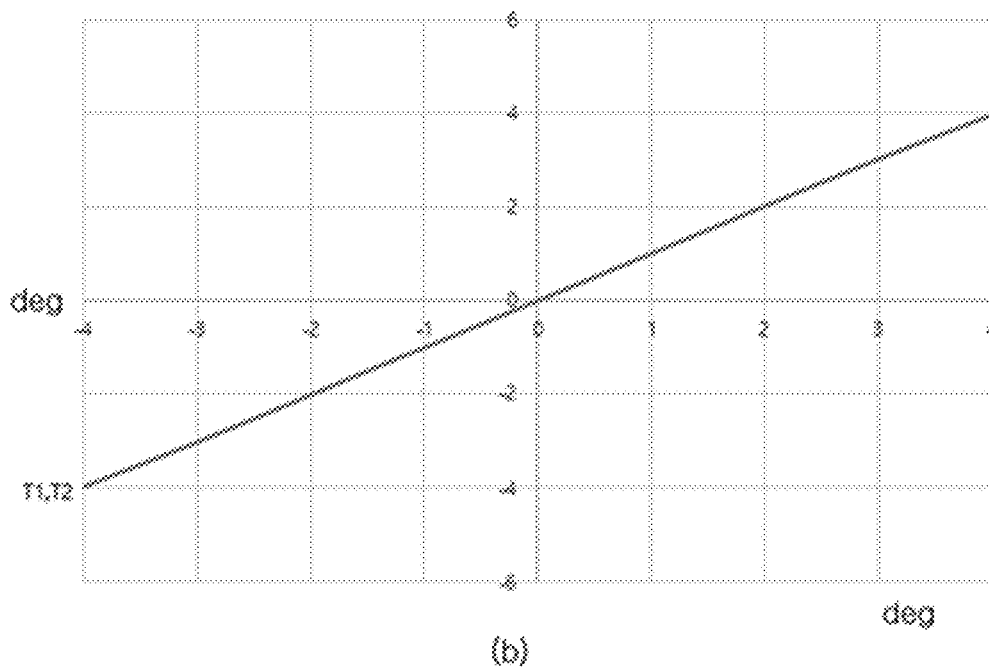

FIGS. 16A and 16B are graphs comparing a sensing value of the first sensor T1 and a sensing value of the second sensor T2 when there is external magnetism (1500 A/m). FIG. 16A shows the sensing value of the first sensor T1 and the sensing value of the second sensor T2 before compensation, and FIG. 16B shows the sensing value of the first sensor T1 and the sensing value of the second sensor T2 after compensation. When there is external magnetism (1500 A/m), a difference value (T2o−T1o) between the sensing value of the first sensor T1 and the sensing value of the second sensor T2 is detected as 0.54. In a case where a is 2.72 and b is 3.72, when the compensated sensing value of the first sensor T1 is obtained through Equation 1 and the compensated sensing value of the second sensor T2 is obtained through Equation 2, as shown in FIG. 16B, the compensated sensing value of the first sensor T1 and the compensated sensing value of the second sensor T2 match, and thus it can be seen that the compensations are made without occurrence of any offset.

Figure 17A:
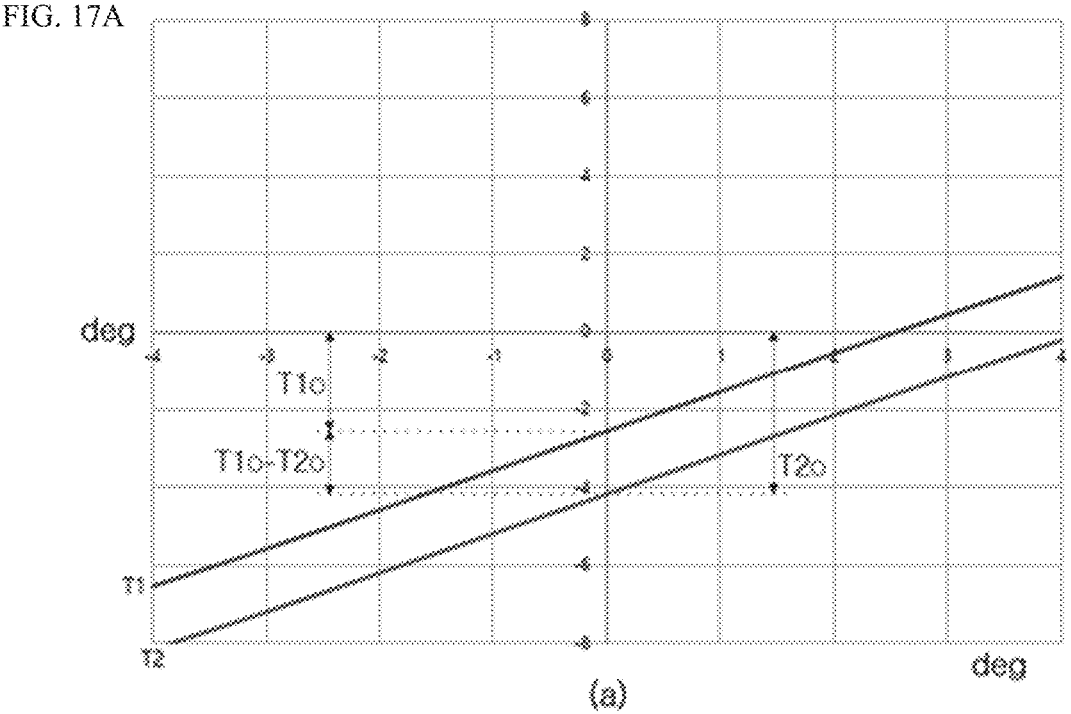
FIGS. 17A and 17B are graphs comparing a sensing value of the first sensor and a sensing value of the second sensor when there is relatively strong external magnetism (4500 A/m).
Figure 17B:
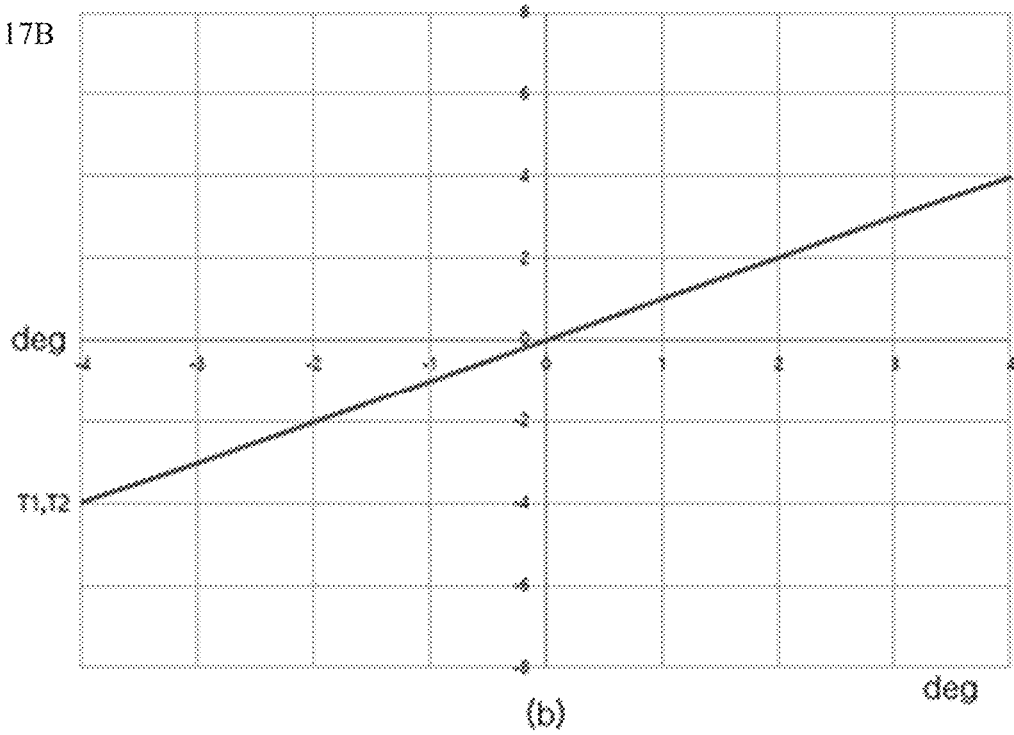

FIGS. 17A and 17B are graphs comparing a sensing value of the first sensor T1 and a sensing value of the second sensor T2 when there is relatively strong external magnetism (4500 A/m). FIG. 17A shows the sensing value of the first sensor T1 and the sensing value of the second sensor T2 before compensation, and FIG. 17B shows the sensing value of the first sensor T1 and the sensing value of the second sensor T2 after compensation.

When there is relatively strong external magnetism (4500 A/m), a difference value (T2o−T1o) between the sensing value of the first sensor T1 and the sensing value of the second sensor T2 is detected as 1.62. In a case where a is 2.72 and b is 3.72, when the compensated sensing value of the first sensor T1 is obtained through Equation 1 and the compensated sensing value of the second sensor T2 is obtained through Equation 2, as shown in FIG. 17B, a small offset (0.002 deg) occurs, but it can be seen that the compensated sensing value of the first sensor T1 and the compensated sensing value of the second sensor T2 almost match.

Figure 18A:
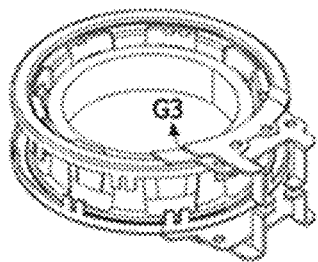
FIGS. 18A-18C are views illustrating a compensation coefficient corresponding to a change in a third gap and a shape of a collector.
Figure 18B:
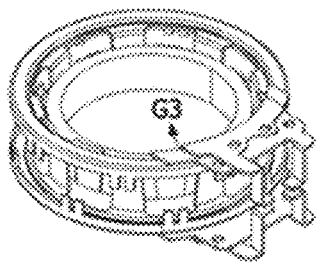
Figure 18C:
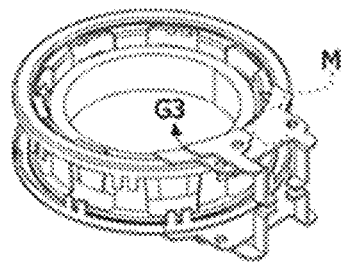

FIGS. 18A-18C are views illustrating a compensation coefficient corresponding to a change in the third gap G3 and a shape of the collector.

FIG. 18A shows the sensing device with the third gap G3 set to 3.15 mm, and FIG. 18B shows the sensing device with the third gap G3 set to 2.15 mm. FIG. 18C is set the same as in FIG. 18B with the third gap G3 set to 2.15 mm, and is set so that the size of the collector is smaller than in FIG. 18A or in FIG. 18B by removing a part of the collector like M in FIG. 18C.

When FIG. 18B and FIG. 18C are compared, there is almost no difference in compensation coefficient, and it can be seen that the shape of the collector does not significantly affect the compensation coefficient. However, when FIG. 18A and FIG. 18B are compared, the difference in compensation coefficient is large, and it can be seen that the difference in the third gap G3 significantly affects the compensation coefficient.

Figure 19:
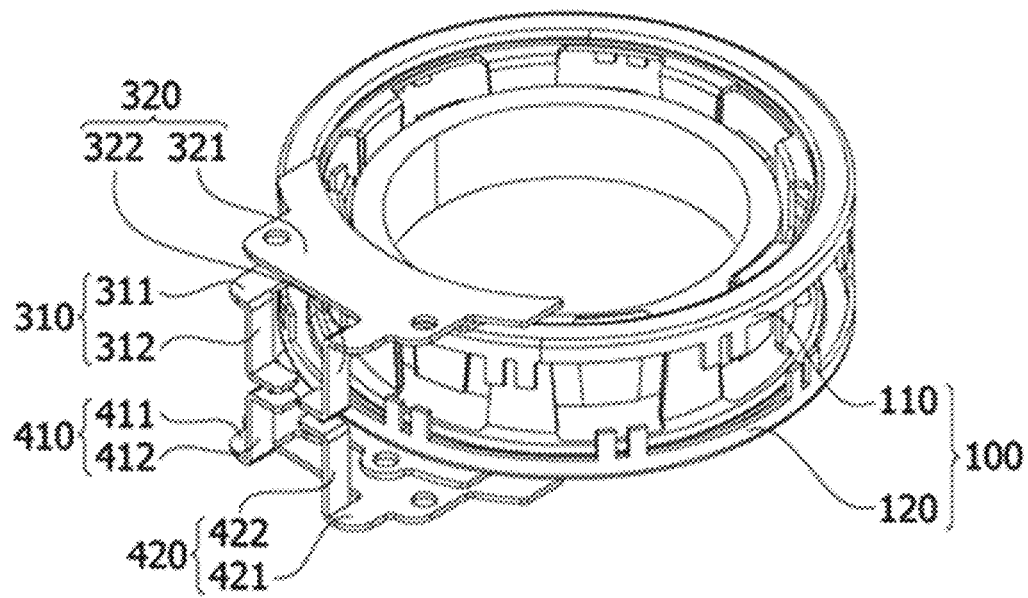
FIG. 19 is a perspective view of a sensing device including a first collector and a second collector according to a modification example.
Figure 20:
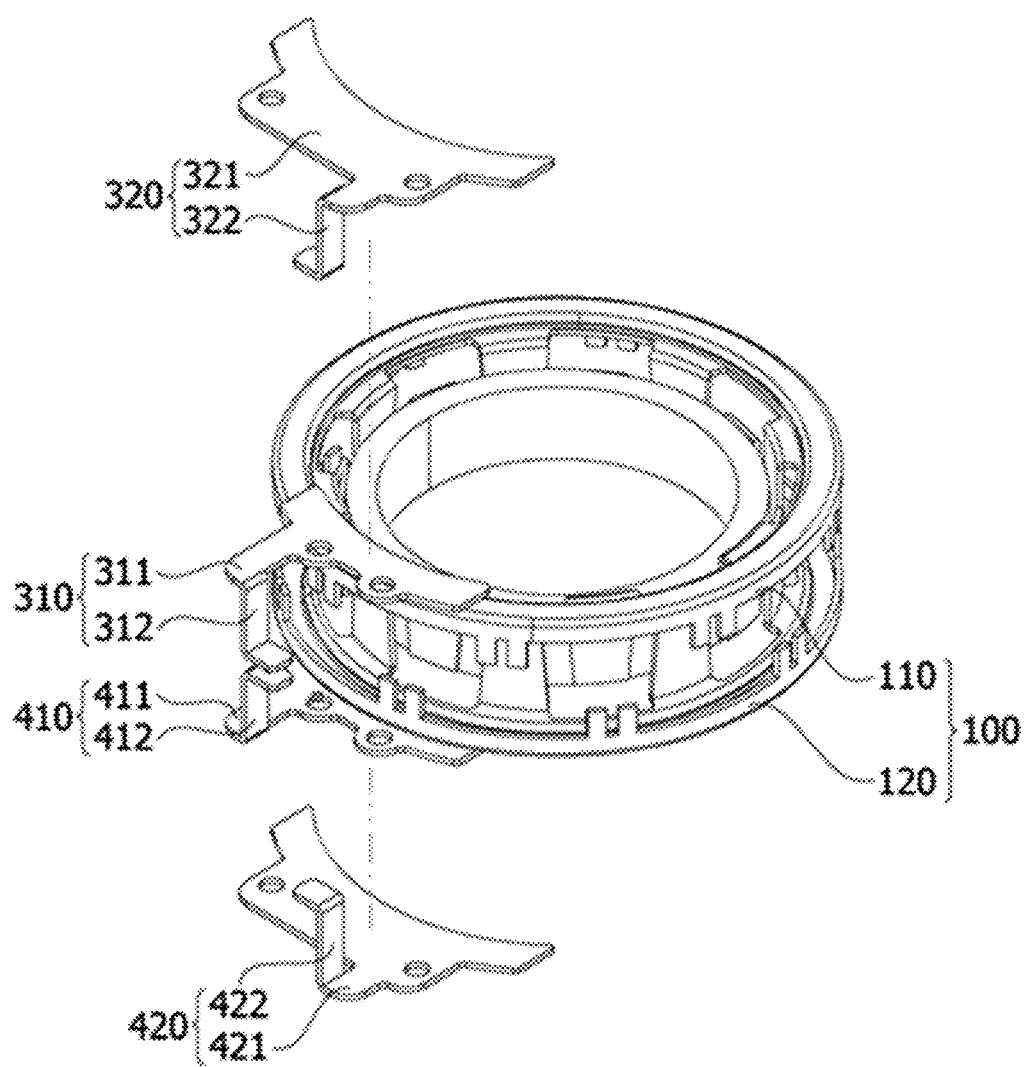
FIG. 20 is an exploded view of the first collector and the second collector illustrated in FIG. 19.
Figure 21:
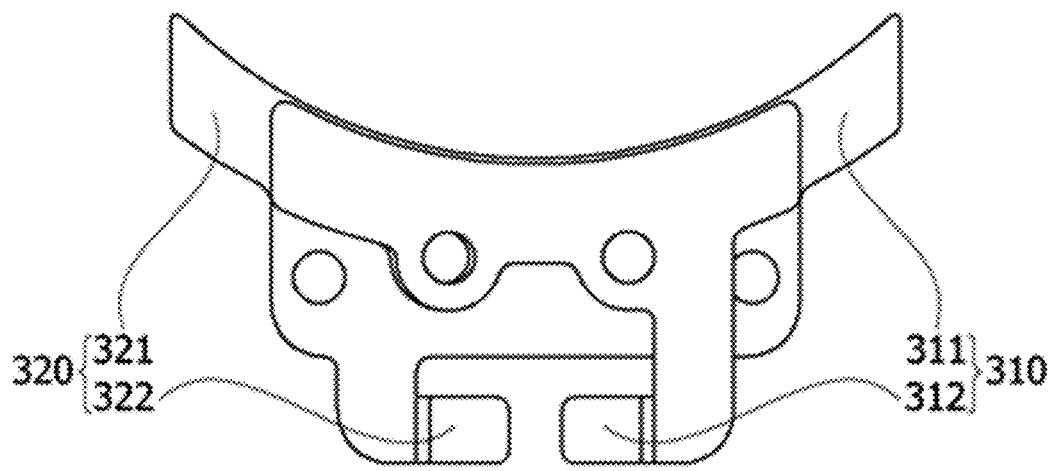
FIG. 21 is a plan view of the first collector illustrated in FIG. 19.

FIG. 19 is a perspective view of a sensing device including a first collector 300 and a second collector 400 according to a modification example, FIG. 20 is an exploded view of the first collector 300 and the second collector 400 illustrated in FIG. 19, and FIG. 21 is a plan view of the first collector 300 illustrated in FIG. 19.

Referring to FIGS. 19 to 21, in the first collector 300 according to the modification example, the size of a second plate 321 of a second unit collector 320 that is positioned relatively outside may be formed to be larger than the size of a first plate 311 of the first unit collector 310. In addition, in the second collector 400 according to the modification example, the size of a fourth plate 421 of a fourth unit collector 420 that is positioned relatively outside may be formed to be larger than the size of a third plate 411 of a third unit collector 410.

The first collector 300 according to the modification example has an advantage of good assemblability to the housing because the size of the first plate 311 of the first unit collector 310 that is positioned relatively inside is small. The second collector 400 according to the modification example also has an advantage of good assemblability to the housing because the size of the third plate 411 of the third unit collector 410 is small.

Figure 22:
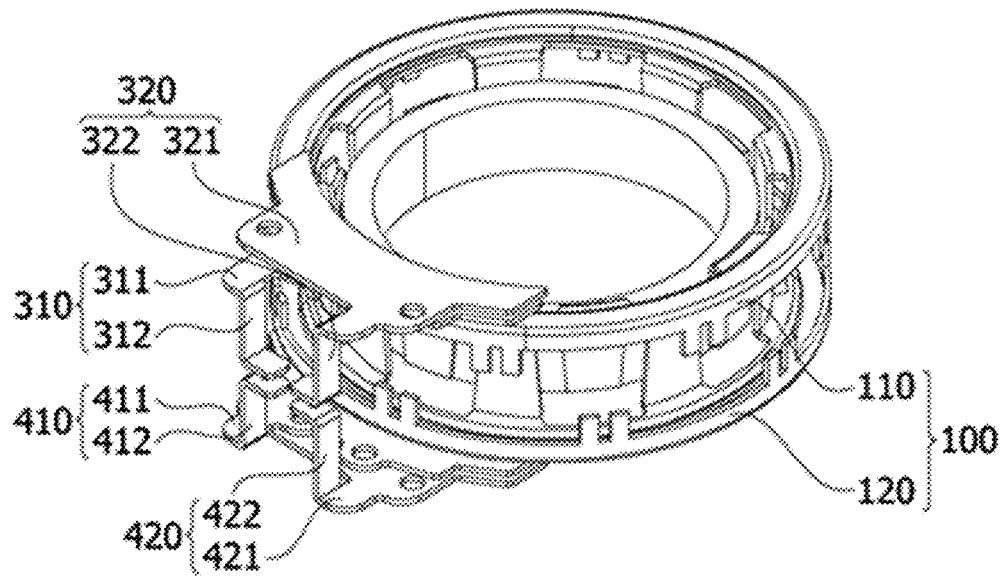
FIG. 22 is a perspective view of a sensing device including a first collector and a second collector according to another modification example.
Figure 23:
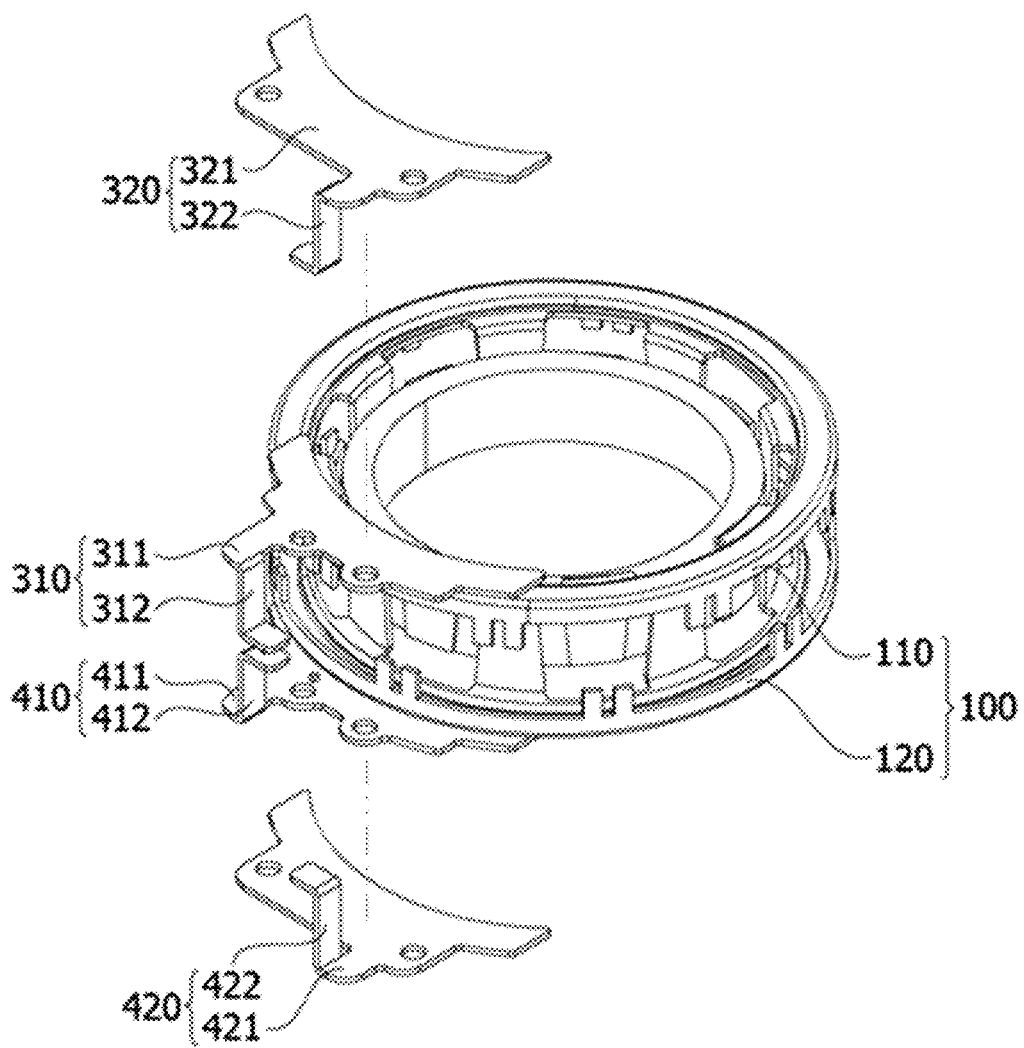
FIG. 23 is an exploded view of the first collector and the second collector illustrated in FIG. 22.
Figure 24:
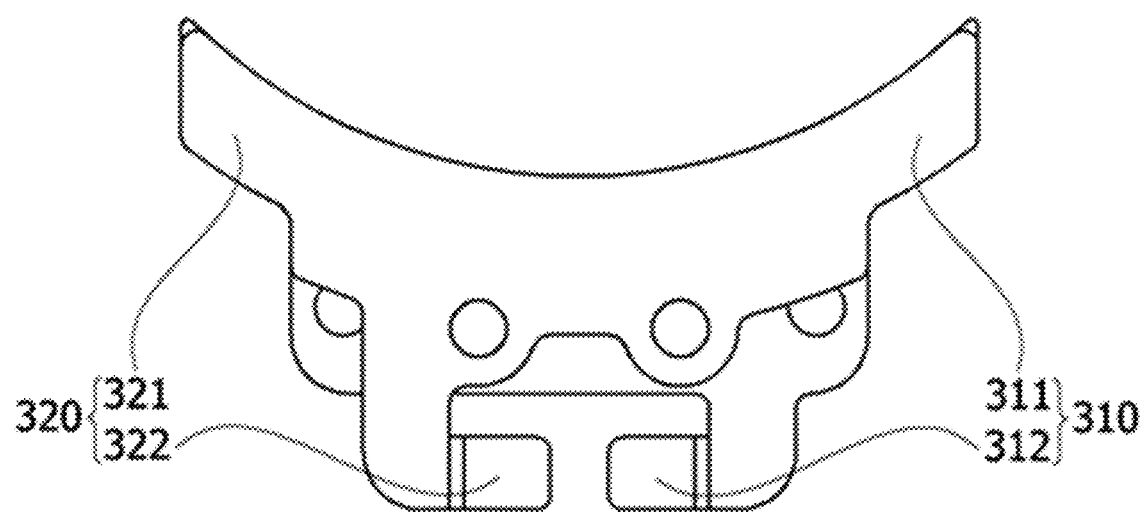
FIG. 24 is a plan view of the first collector illustrated in FIG. 22.

FIG. 22 is a perspective view of a sensing device including a first collector 300 and a second collector 400 according to another modification example, FIG. 23 is an exploded view of the first collector 300 and the second collector 400 illustrated in FIG. 22, and FIG. 24 is a plan view of the first collector 300 illustrated in FIG. 22.

Referring to FIGS. 22 to 24, in the first collector 300 according to the other modification example, a second plate 321 of a second unit collector 320 and a first plate 311 of a first unit collector 310 may be the same or similar in size. In addition, in the second collector 400 according to the modification example, the size of the fourth plate 421 of a fourth unit collector 420 may be the same or similar to the size of a third plate 411 of a third unit collector 410.

The above-described embodiment may be used in various devices such as vehicles or home appliances.

The invention claimed is:
1. A sensing device comprising:
a rotor;
a stator disposed to correspond to the rotor;
a first collector disposed on an upper side of the stator and a second collector disposed on a lower side of the stator; and
a first sensor and a second sensor disposed between the first collector and the second collector,
wherein the first collector includes a first unit collector and a second unit collector, and
compensate at least one sensing value of the first sensor and the second sensor based on a difference between a sensing value of the first sensor by magnetic flux transmitted to the first unit collector and a sensing value of the second sensor by magnetic flux transmitted to the second unit collector, wherein the sensing value of the first sensor is compensated for with a compensation value calculated by Equation 1 below, $$T1c = T1o - a*(T2o - T1o) \qquad \text{[Equation 1]}$$

where "T1c" is a compensated sensing value of the first sensor, "T1o" is a sensing value of the first sensor before compensation, "T2o" is a sensing value of the second sensor before compensation, and "a" is a compensation coefficient corresponding to an axial separation distance between the first unit collector and the second unit collector.

2. A sensing device comprising:
a rotor;
a stator disposed to correspond to the rotor;
a first collector disposed on an upper side of the stator and a second collector disposed on a lower side of the stator; and
a first sensor and a second sensor disposed between the first collector and the second collector,
wherein the first collector includes a first unit collector and a second unit collector, and
compensate at least one sensing value of the first sensor and the second sensor based on a difference between a sensing value of the first sensor by magnetic flux transmitted to the first unit collector and a sensing value of the second sensor by magnetic flux transmitted to the second unit collector,
wherein the sensing value of the second sensor is compensated for with a compensation value calculated by Equation 2 below, $$T2c = T2o - b*(T2o - T1o) \qquad \text{[Equation 2]}$$

where "T2c" is a compensated sensing value of the second sensor, "T1o" is a sensing value of the first sensor before compensation, "T2o" is a sensing value of the second sensor before compensation, and "b" is a compensation coefficient corresponding to an axial separation distance between the first unit collector and the second unit collector.

3. The sensing device of claim 1,
wherein the first unit collector includes a first plate and a first leg protruding from the first plate and extending in a direction toward the second collector, the second unit collector includes a second plate and a second leg protruding from the second plate and extending in a direction toward the second collector,
wherein the first plate is spaced apart from and overlaps the second plate in an axial direction.

4. The sensing device of claim 1,
wherein the first unit collector includes a first plate and a first leg protruding from the first plate and extending in a direction toward the second collector, the second unit collector includes a second plate and a second leg protruding from the second plate and extending in a direction toward the second collector,
wherein the third plate is spaced apart from and overlaps the fourth plate in an axial direction.

5. The sensing device of claim 4, wherein the second collector includes a third unit collector and a fourth unit collector,
the third unit collector includes a third plate and a third leg protruding from the third plate and extending in a direction toward the first collector, and
the fourth unit collector includes a fourth plate and a fourth leg protruding from the fourth plate and extending in a direction toward the first collector.

6. The sensing device of claim 5, wherein a size of the first plate is larger than a size of the second plate, and a size of the third plate is larger than a size of the fourth plate.

7. The sensing device of claim 5, wherein a size of the first plate is smaller than a size of the second plate, and a size of the third plate is smaller than a size of the fourth plate.

* * * * *